(12) United States Patent
Nishimura et al.

(10) Patent No.: US 7,261,554 B2
(45) Date of Patent: Aug. 28, 2007

(54) INJECTION UNIT OF INJECTION MOLDING MACHINE

(75) Inventors: Koichi Nishimura, Susono (JP); Koji Shima, Fujiyoshida (JP)

(73) Assignee: Fanuc LTD, Yamanashi (JP)

( * ) Notice: Subject to any disclaimer, the term of this patent is extended or adjusted under 35 U.S.C. 154(b) by 320 days.

(21) Appl. No.: 11/082,648

(22) Filed: Mar. 18, 2005

(65) Prior Publication Data
US 2005/0208176 A1    Sep. 22, 2005

(30) Foreign Application Priority Data
Mar. 18, 2004    (JP)    ............................. 2004-078148

(51) Int. Cl.
*B29C 45/47*    (2006.01)
(52) U.S. Cl. ..................................... 425/587
(58) Field of Classification Search ................ 425/145, 425/150, 587
See application file for complete search history.

(56) References Cited

U.S. PATENT DOCUMENTS

| | | | |
|---|---|---|---|
| 4,693,676 A | * | 9/1987 | Inaba .......................... 425/145 |
| 4,741,685 A | * | 5/1988 | Inaba et al. .................. 425/145 |
| 5,129,808 A | * | 7/1992 | Watanabe et al. ........... 425/145 |
| 5,206,034 A | * | 4/1993 | Yamazaki .................... 425/145 |
| 5,955,117 A | | 9/1999 | Ito et al. |
| 2003/0049351 A1 | | 3/2003 | Kasai et al. |

FOREIGN PATENT DOCUMENTS

| | | |
|---|---|---|
| JP | 9-29793 | 2/1997 |
| JP | 9-174628 | 7/1997 |
| JP | 2754356 | 6/1998 |
| JP | 2000-190363 | 7/2000 |
| JP | 2000-218663 | 8/2000 |
| JP | 2001-248706 | 9/2001 |
| JP | 2001-269974 | 10/2001 |

* cited by examiner

*Primary Examiner*—Tim Heitbrink
(74) *Attorney, Agent, or Firm*—Staas & Halsey LLP

(57) ABSTRACT

An injection unit in which an offset load is not applied to a ball screw for moving an injection screw. A pusher plate is provided that is moved while being guided by guide rods extending between front and rear plates, and is mounted with the injection screw and the ball screw so as to be rotatable but axially immovable. The ball screw is threadedly engaged with a nut mounted to the rear plate so as to be unrotatable and axially immovable. A support plate is coupled through coupling rods to the pusher plate. The ball screw has another end supported on the support plate in a rotatable but axially immovable manner. The pusher and support plates are supported on a base by linear motion guides. The ball screw is supported at its both ends by the pusher and support plates so as not to be tilted, whereby no offset load is produced and the service life is prolonged.

8 Claims, 9 Drawing Sheets

INJECTION UNIT OF INJECTION MOLDING MACHINE

BACKGROUND OF THE INVENTION

1. Field of the Invention

The present invention relates to an injection molding machine, and more particularly to an injection unit of an injection molding machine using a ball screw/nut mechanism to perform an injection operation.

2. Description of Related Art

In most cases, an electrically-driven injection molding machine uses an injection unit that performs injection by driving a ball screw/nut mechanism by means of a motor to axially drive a pusher plate to thereby axially move an injection screw attached to the pusher plate in a rotatable but axially immovable manner.

FIGS. 9a and 9b are explanatory views of an injection unit that has heretofore generally been used. This injection unit includes a base 1 to which front and rear plates 2, 3 are fixed. A plurality of guide rods 4 are mounted between the front and rear plates 2, 3. A pusher plate 5 is arranged to move in the direction of injection (in the left and right direction in the drawing) while being guided by the guide rods 4. A ball screw 6 is fixed to the pusher plate 5 so as to be rotatable but axially immovable, and threadedly engaged with a ball nut 7 fixed through a load cell 12 to the rear platen 3 so as to be unrotatable and axially immovable.

An injection motor 8 is mounted to the pusher plate 5. A timing belt 11 is looped around a driving pulley 9 provided on the output shaft of the motor 8 and a driven pulley 10 attached to the ball screw 6. The ball screw 6 is rotatably driven by the motor 8.

An injection screw 13 is attached, in a rotatable but axially immovable manner, to a face of the pusher plate 5 on the side opposite a face thereof to which the ball screw 6 is mounted. A pulley 15 for rotating the injection screw 13 is attached to the injection screw 13 and adapted to be driven by a screw rotation motor, not shown. The injection screw 13 is inserted in a heating cylinder 14 fixed to the front plate 2.

Starting from a state shown in FIG. 9a, the injection screw 13 is rotated, whereby resin supplied into the heating cylinder 14 is kneaded and melted. At this time, a molten resin pressure is produced, which exerts to move the injection screw 13 backward against a back pressure given by the injection motor 8, etc., whereby the resin is kneaded and metered. FIG. 9b shows a state in the metering and kneading process where the injection screw 13, the pusher plate 5, and the ball screw 6 are moved backward. At the time of the backward movement, the ball screw 6 rotates while being moved backward in the axial direction. The motor 8 is driven to rotate the ball screw 6 through a transmission mechanism including the driving pulley 9, the timing belt 11, and the driven pulley 10, whereby injection operation is performed. Since the nut 7 threadedly engaged with the ball screw 6 is fixed to the rear platen in an unrotatable and axially immovable manner, the ball screw 6 moves axially when rotated, whereby the injection screw 13 is moved through the pusher plate 5 in the direction of injection (the axial direction of the injection screw 13), so that molten resin is injected into a die, not shown.

The above is to describe how the injection unit operates. When the injection screw 13, the pusher plate 5, and the ball screw 6 are moved backward as shown in FIG. 9b, the ball screw 6 tilts by gravity as indicated by θ in FIG. 9b that is only supported at its one end by the pusher plate 5, with another end unsupported. Thus, the ball screw 6 receives an offset load, and therefore, an offset load is applied also to the threaded coupling between the ball screw and the nut 7, resulting in a shortened life of the ball screw/nut mechanism.

The present invention contemplates to prevent an offset load from being applied to the ball screw. In relation to the present invention, an invention is known which comprises an auxiliary member coupled to a pusher plate by means of guide rods and in which a rear end of a ball screw rotatably supported by the auxiliary member is rotatably driven by a servomotor attached to the auxiliary member (See unexamined JP 2000-218663A and JP 2754356B).

Also known is the one in which a pusher plate arranged to be movable in the direction of injection is supported for linear motion by means of linear motion guides (see JP 2001-269974A).

SUMMARY OF THE INVENTION

The present invention provides an injection unit in which an offset load is not applied to a ball screw for axially moving an injection screw.

An injection unit in an injection molding machine of the present invention comprising: a rear plate; a ball nut attached to the rear plate to be unrotatable and axially immovable; a pusher plate supported movably in an axial direction of the injection screw for pushing one end of the injection screw; a support plate supported movably in the axial direction of the injection screw and connected with the pusher plate to be moved therewith; and a ball screw threadedly engaged with the ball nut and having one end rotatably supported by the pusher plate to be immovable with respect to the pusher plate and another end rotatably supported by the support plate, thereby the pusher plate is moved with the support plate by rotation of the ball screw to move the injection screw axially.

The pusher plate and the support plate may be supported by support members provided on a base.

A motor for rotating the ball screw may be mounted on the pusher plate and rotation of the motor may be transmitted to the ball screw through a timing belt connecting a driving pulley fixed to the motor and a driven pulley fixed to the ball screw.

A motor for rotating the ball screw may be mounted on the support plate. In this case, the other end of the ball screw may be connected to the motor through a coupling behind the support plate. Alternatively, rotation of the motor is transmitted to the ball screw through a timing belt connecting a driving pulley fixed to the motor and a driven pulley fixed to the ball screw.

The rear plate may be integrally formed with a front plate supporting a heating cylinder into which the injection screw is inserted.

The pusher plate may be integrally formed with the support plate. A member for placing the supporting members may be provided on the base.

According to the present invention, the ball screw for axially driving the injection screw is supported at both ends by the pusher plate and the support plate, respectively, and the pusher and support plates are supported on the base by the supporting members, and therefore, the ball screw is prevented from being tilted, whereby an offset load is prevented from being applied to the ball screw, and thus the service life of the ball screw/nut mechanism can be prolonged.

DETAILED DESCRIPTION

Figure 1A:
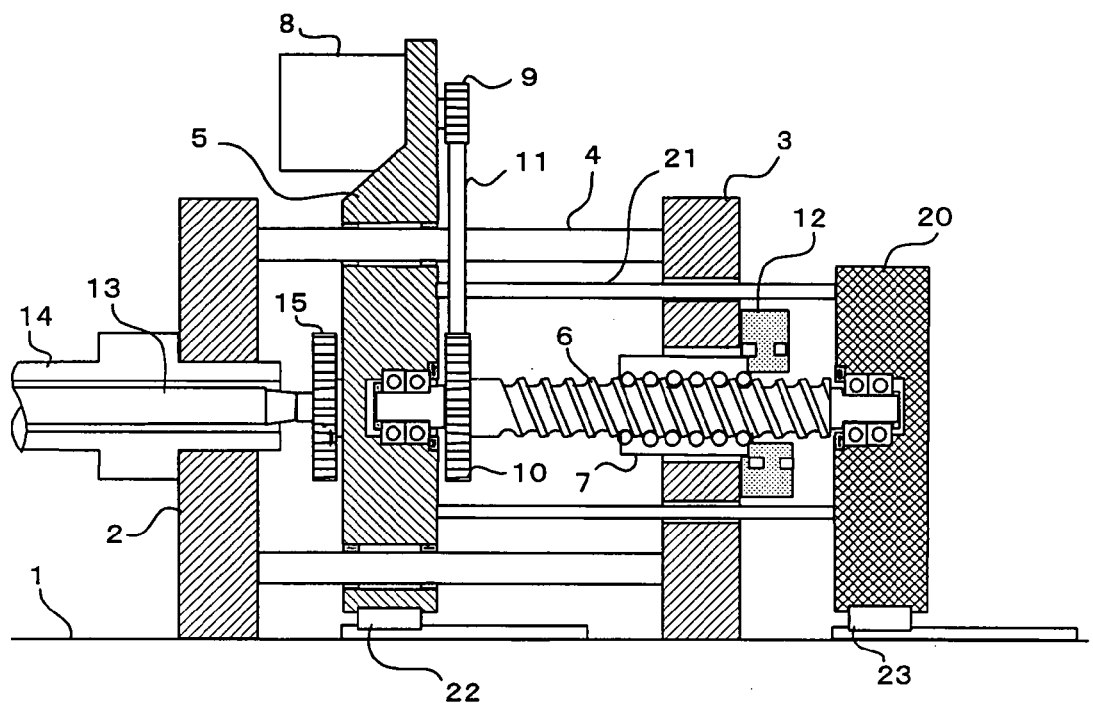
FIGS. 1a and 1b are explanatory views of a first embodiment of the present invention.
Figure 1B:
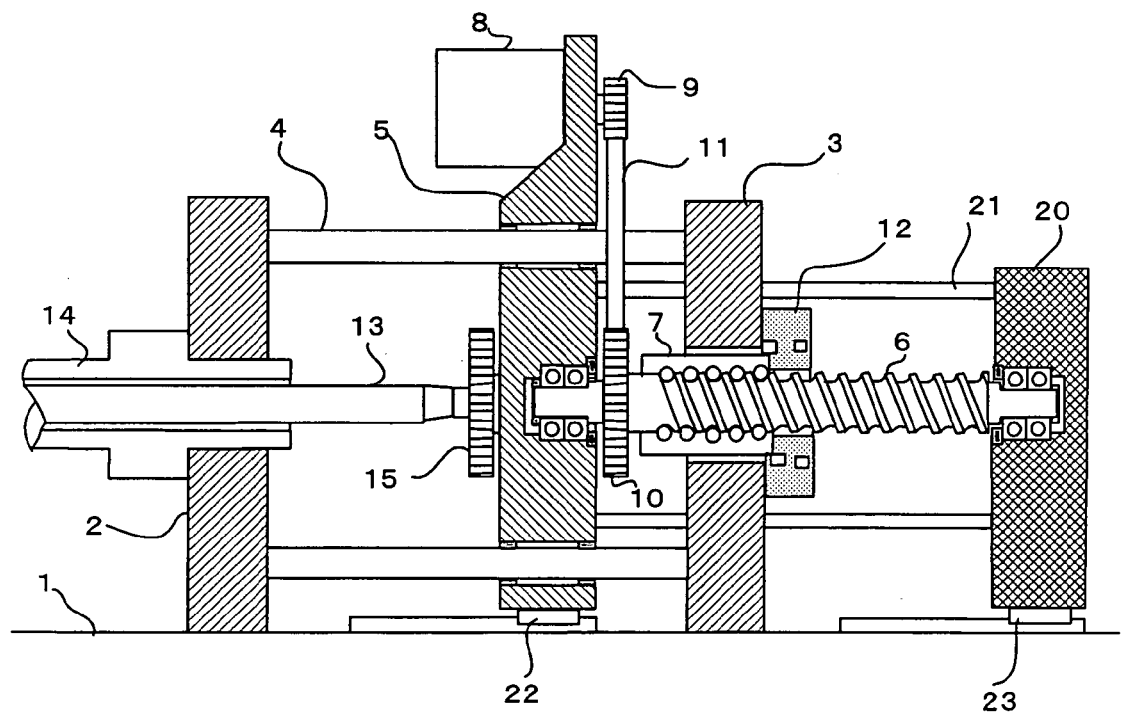

FIGS. 1a and 1b are explanatory views of a first embodiment of the present invention, in which an injection unit is seen from side. As compared to the conventional injection unit shown in FIGS. 9a and 9b, differences reside in that a support plate 20 is provided behind the rear plate 3, and the support plate 20 and the pusher plate 5 are supported by support members (linear motion guides 22, 23) provided on the base 1 of the injection unit.

The front plate 2 and the rear plate 3 are fixed to the base 1 of the injection unit and spaced apart from each other. The front and rear plates 2, 3 are coupled to each other by means of a plurality of guide rods 4. The pusher plate 5 is moved in the direction of injection (in the left and right direction in the drawing) while being guided by the guide rods 4. The ball screw 6 is fixed to the pusher plate 5 in a rotatable but axially immovable manner, and is threadedly engaged through the load cell 12 with the ball nut 7 that is fixed to the rear plate 3 so as to be unrotatable and axially immovable.

The injection motor 8 is mounted to the pusher plate 5. The timing belt 11 is looped around the driving pulley 9 provided on the output shaft of the motor 8 and the driven pulley 10 attached to the ball screw 6, so that the ball screw 6 is rotatably driven by the motor 8. The injection screw 13 is attached, in a rotatable but axially immovable manner, to a face of the pusher plate 5 on the side opposite a face thereof mounted with the ball screw 6. A pulley 15 for rotating the injection screw 13 is attached to the injection screw 13 and adapted to be driven by the screw rotation motor, not shown. The injection screw 13 is inserted into the heating cylinder 14 fixed to the front plate 2.

Figure 9A:
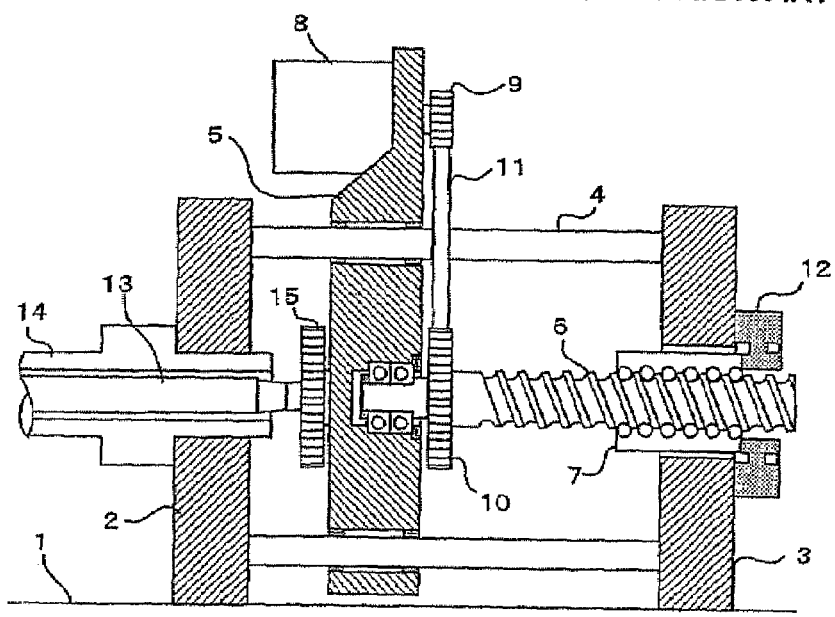
FIGS. 9a and 9b are explanatory views of an example of the conventional injection unit.
Figure 9B:
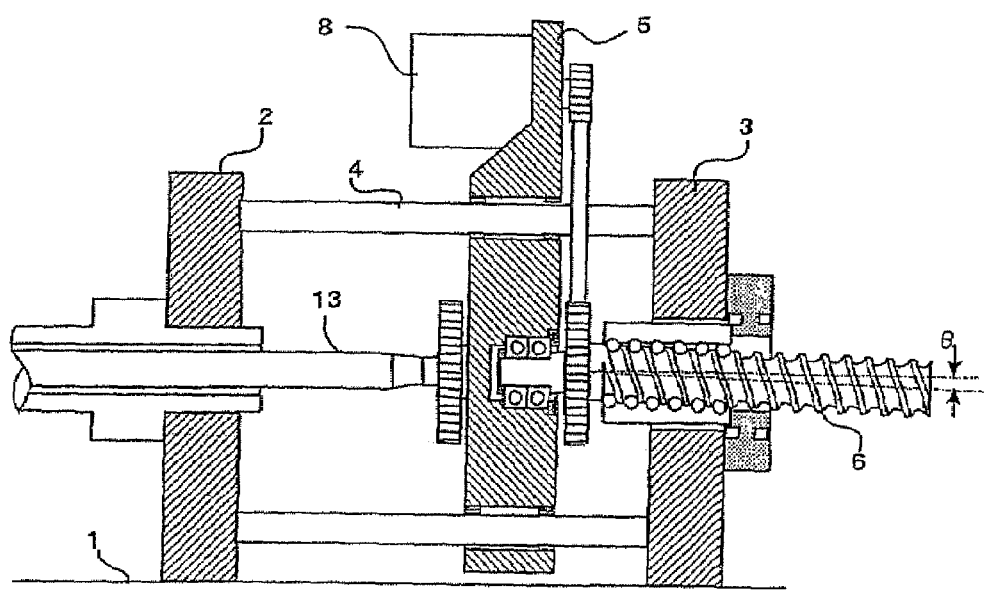

As far as the aforementioned construction is concerned, the first embodiment of the present invention is the same as the conventional injection unit shown in FIGS. 9a and 9b. In the first embodiment, the support plate 20 is attached to the pusher plate 5 through a plurality of coupling rods 21, so that the pusher plate 5 and the support plate 20 are moved together. The ball screw 6 whose one end is mounted to the pusher plate 5 so as to be rotatable but axially immovable has another end thereof attached to the support plate 20 so as to be rotatable but axially immovable. Meanwhile, in the first embodiment, the rear plate 3 is formed with a hole for permitting the coupling rods 21 to extend therethrough, and the pusher plate 5 and the support plate 20 are coupled and fixed to each other by means of the coupling rods 21 loosely fitted in the hole. The pusher plate 5 and the support plate 20 are supported by the supporting members or the linear motion guides 22, 23 provided on the base 1 of the injection unit parallel to the guide rods 4 (parallel to the direction of injection), so that their linear motion is guided.

The state shown in FIG. 1a is a state where injection is completed by moving the injection screw 13 forward (from the right to the left in FIG. 1). The state shown in FIG. 1b represents a state where the metering and kneading process is completed, with the injection screw 13 moved backward. The metering and kneading process is entered from the state shown in FIG. 1a, and the injection screw 13 is rotated. With rotation of the injection screw 13 and the like, resin supplied to the heating cylinder 14, etc. is melted, and the injection screw 13 receives a molten resin pressure and is moved backward. The pusher plate 5, to which the injection screw 13 is attached so as to be rotatable but axially immovable, is also moved back while being guided by the guide rods 4 and the linear motion guide 22. Also, the support plate 20 coupled thereto by the coupling rods 21 is also moved backward while being guided by the linear motion guide 23, whereby the state shown in FIG. 1b is reached. In the next injection process, the motor 8 is driven to rotatably drive the ball screw 6 through the transmission mechanism including the driving pulley 9, the timing belt 11, and the driven pulley 10, whereby the ball screw 6, threadedly engaged with the nut 7 fixed to the rear plate 3 so as to be unrotatable and axially immovable, is rotated and moved forward, thereby moving the pusher plate 5 and the injection screw 13 forward, so that the molten resin is injected into the die, not shown. At this time, the support plate 20 is moved forward while being guided by the linear motion guide 23, and the pusher plate 5 is moved forward while being guided by the guide rods 4 and the linear motion guide 22, resulting in the state shown in FIG. 1a. Subsequently, the above operation is repeated, whereby molded products are successively molded.

In the first embodiment, the ball screw 6 is supported at its both ends by the pusher plate 5 and the support plate 20 so as to be rotatable but axially immovable. Since the pusher plate 5 and the support plate 20 are supported by the linear motion guides 22, 23, the ball screw 6 is always held parallel to the direction of injection, and is not tilted by gravity unlike the case shown in FIG. 9b.

Figure 2:
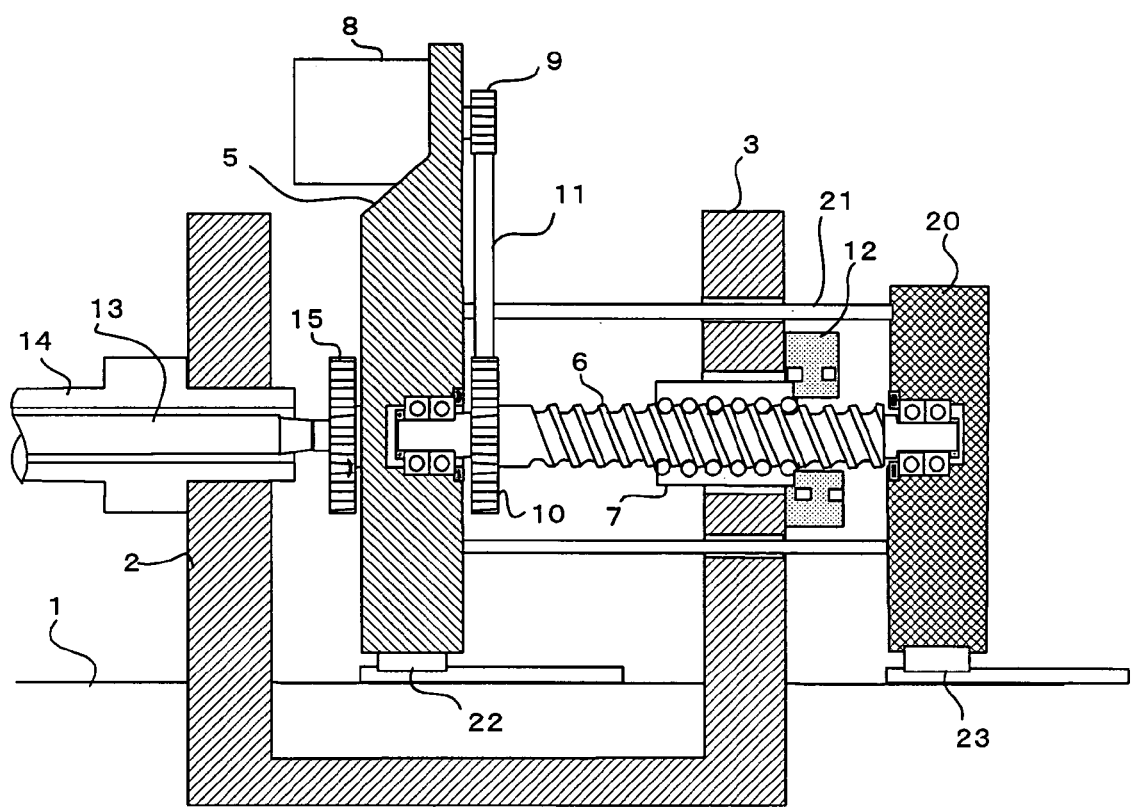
FIG. 2 is an explanatory view of a second embodiment of the present invention.

FIG. 2 is an explanatory view of a second embodiment of the present invention. In the second embodiment, the guide rods 4 are omitted and not provided. The front plate 2 and the rear plate 3 are formed into one piece and mounted to the base 1 of the injection unit. The other structure is the same as that of the first embodiment.

The pusher plate 5 and the support plate 20 coupled thereto by means of the coupling rod 21 are supported by the linear motion guides 22, 23 and their movement is guided by these guides. Thus, unlike the first embodiment shown in FIGS. 1a and 1b, the guide rods 4 are not required and may be omitted, and accordingly, the linear motion of the pusher plate 5 and the support plate 20 is guided only by means of the linear motion guides 22, 23. The operation of the injection unit is the same as that of the first embodiment, and thus an explanation thereof is omitted herein.

Figure 3:
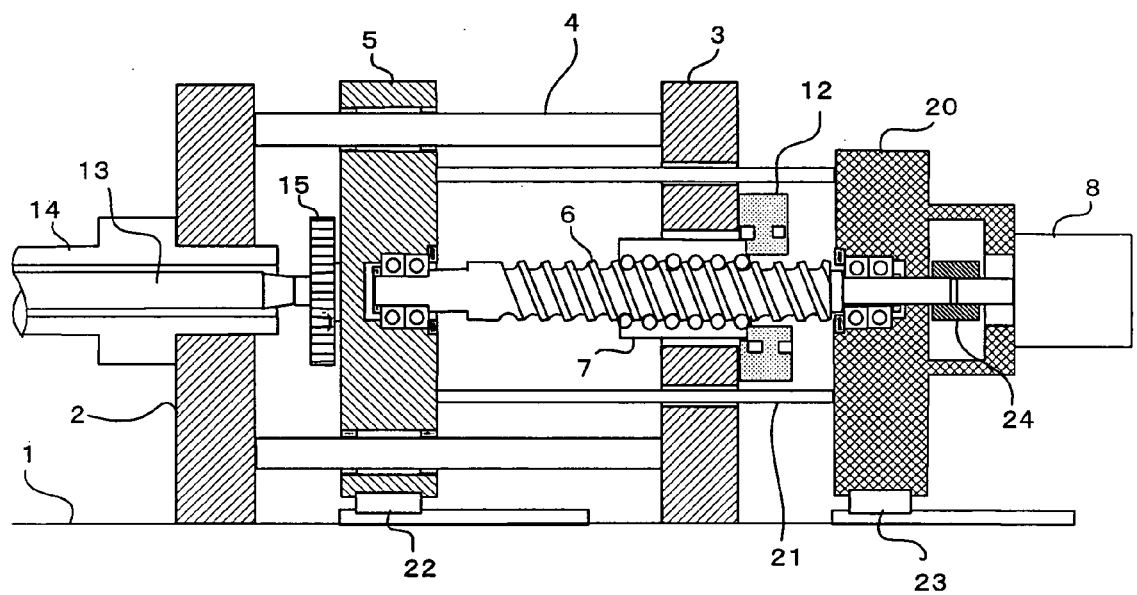
FIG. 3 is an explanatory view of a third embodiment of the present invention.

FIG. 3 is an explanatory view of a third embodiment of the present invention. As compared to the first embodiment, the third embodiment differs only in the mode of driving of the ball screw 6. In the third embodiment, the motor 8 for rotatably driving the ball screw 6 is mounted to the support plate 20. The ball screw 6 has a rear end thereof supported by the support plate 20 in a rotatable but axially immovable manner. The rear end of the ball screw 6 is extended and coupled through a coupling 24 to a motor shaft of the motor 8 mounted to the support plate 20. In other respects, the construction is the same as the first embodiment. When the motor 8 is driven, the ball screw 6 is rotatably driven through the coupling 24, to thereby move forward the pressure plate 5 and the support plate 20 that are guided by the linear motion guides 22, 23 and then by the guide rods 4, whereby the injection screw 13 is moved forward so that molten resin is injected into the die, as mentioned above.

In the metering process, the injection screw 13, the pusher plate 5, and the support plate 20 are pressed backward under a pressure of the resin melted by the rotation of the injection screw 13, etc., whereby they are moved back while being guided by the linear motion guides 22, 23 and the guide rods 4.

Also in the third embodiment, both ends of the ball screw 6 are supported by the pusher plate 5 and the support plate 20 in a rotatable but axially immovable manner. Since the pusher plate 5 and the support plate 20 are supported by the linear motion guides 22 and 23, the ball screw 6 is not tilted by gravity.

Figure 4:
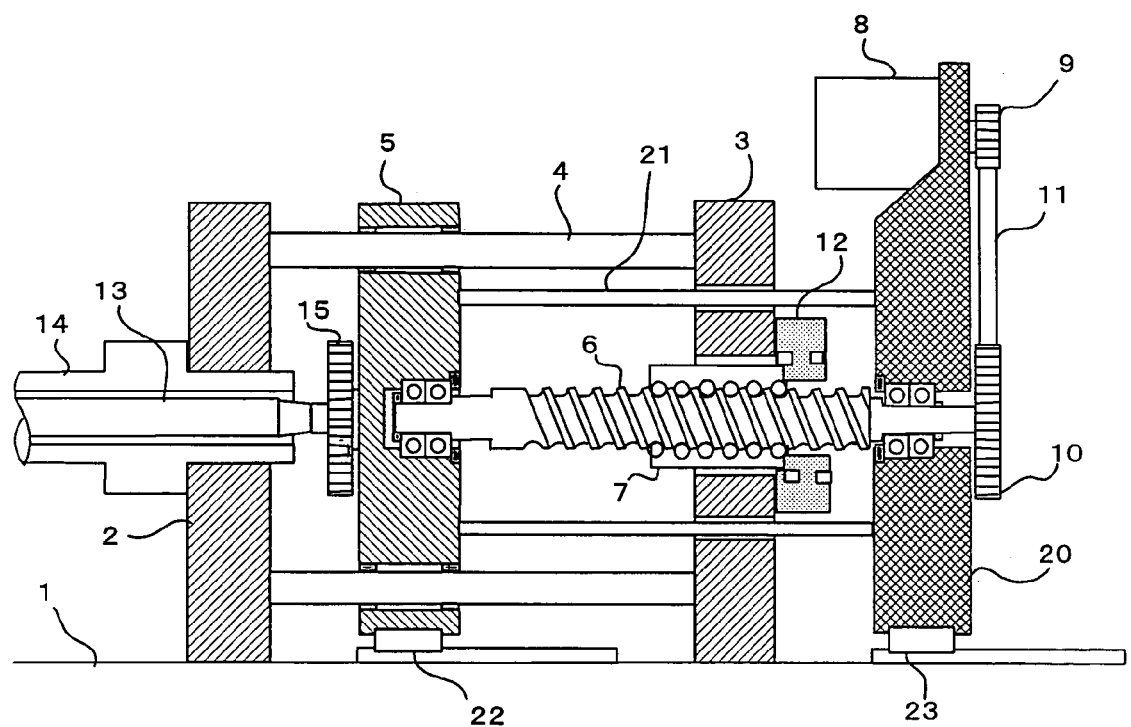
FIG. 4 is an explanatory view of a fourth embodiment of the present invention.

FIG. 4 is an explanatory view of a fourth embodiment of the present invention. Unlike the third embodiment where the ball screw 6 is directly connected to the motor 8 to drive the ball screw 6, the fourth embodiment is provided with a transmission mechanism for driving the ball screw 6. The motor 8 for driving the ball screw 6 is mounted to the support plate 20, and a timing belt 11 is looped around the driving pulley 9 mounted on the output shaft of the motor and the driven pulley 10 mounted to the rear end of the ball screw 6. The construction is the same as the third embodiment except only in that the ball screw 6 is rotatably driven through the transmission mechanism constituted by the driving pulley 9, the driven pulley 10, and the timing belt 11. The operation is also the same as the third embodiment. Specifically, the ball screw 6 is rotatably driven by the motor 8 to forwardly move the injection screw 13, the pusher plate 5, and the support plate 20 to thereby perform injection, and in the metering and kneading process, the injection screw 13, the pusher plate 5, and the support plate 20 are moved backward. At this time, the forward and backward motions are guided by means of the linear motion guides 22, 23 and the guide rods 4. Also in the fourth embodiment, the ball screw 6 is prevented from being tilted.

Figure 5:
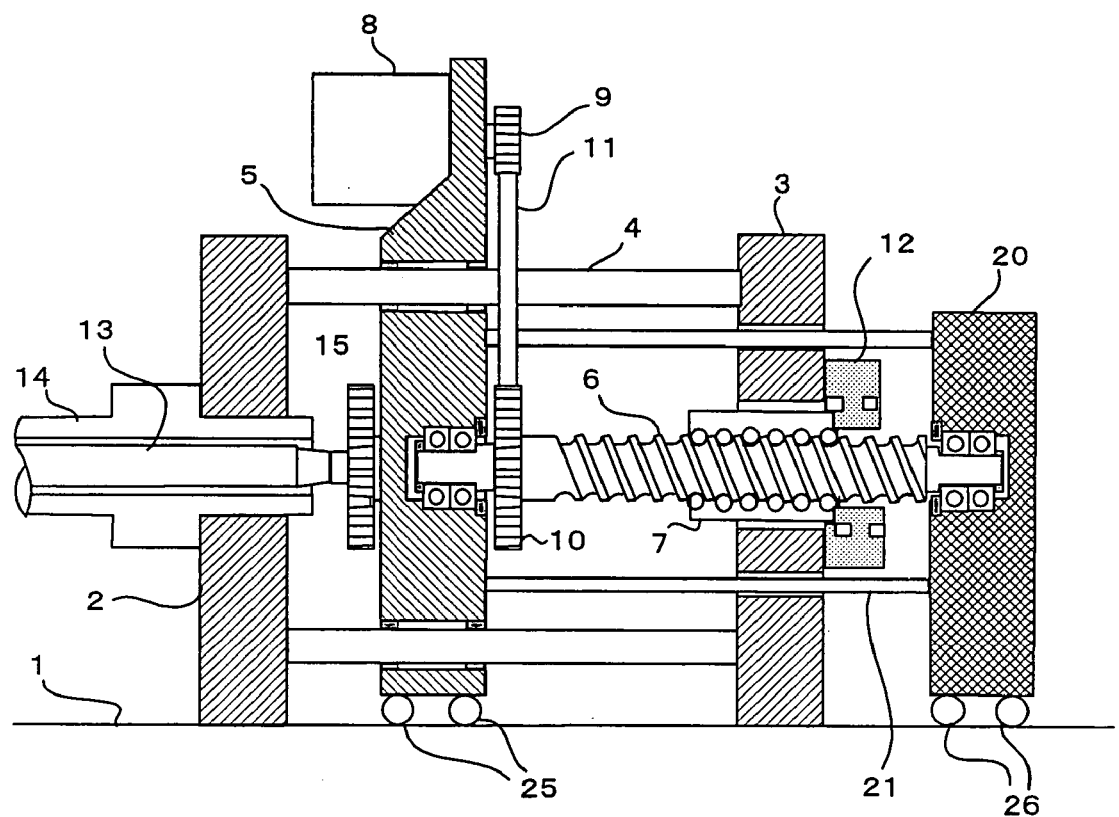
FIG. 5 is an explanatory view of a fifth embodiment of the present invention.

FIG. 5 is an explanatory view of a fifth embodiment of the present invention. As compared with the first embodiment, the fifth embodiment is different in that support members for supporting the pusher plate 5 and the support plate 20 on the base 1 are provided with rollers instead of the linear motion guides. In the fifth embodiment, rollers 25, 26 are rotatably supported on faces of the pusher plate 5 and the support plate 20 on the side facing the base 1. The pusher plate 5 and the support plate 20 are moved back and forth in the direction of injection (in the left and right direction in FIG. 5) while being supported by the rollers 25, 26. The guiding of the forward and backward motions is achieved by the guide rods 4. In respect of other construction, function, and operation, and the prevention of tilting of the ball screw are the same as the first embodiment. Explanations thereof are omitted herein.

Figure 6A:
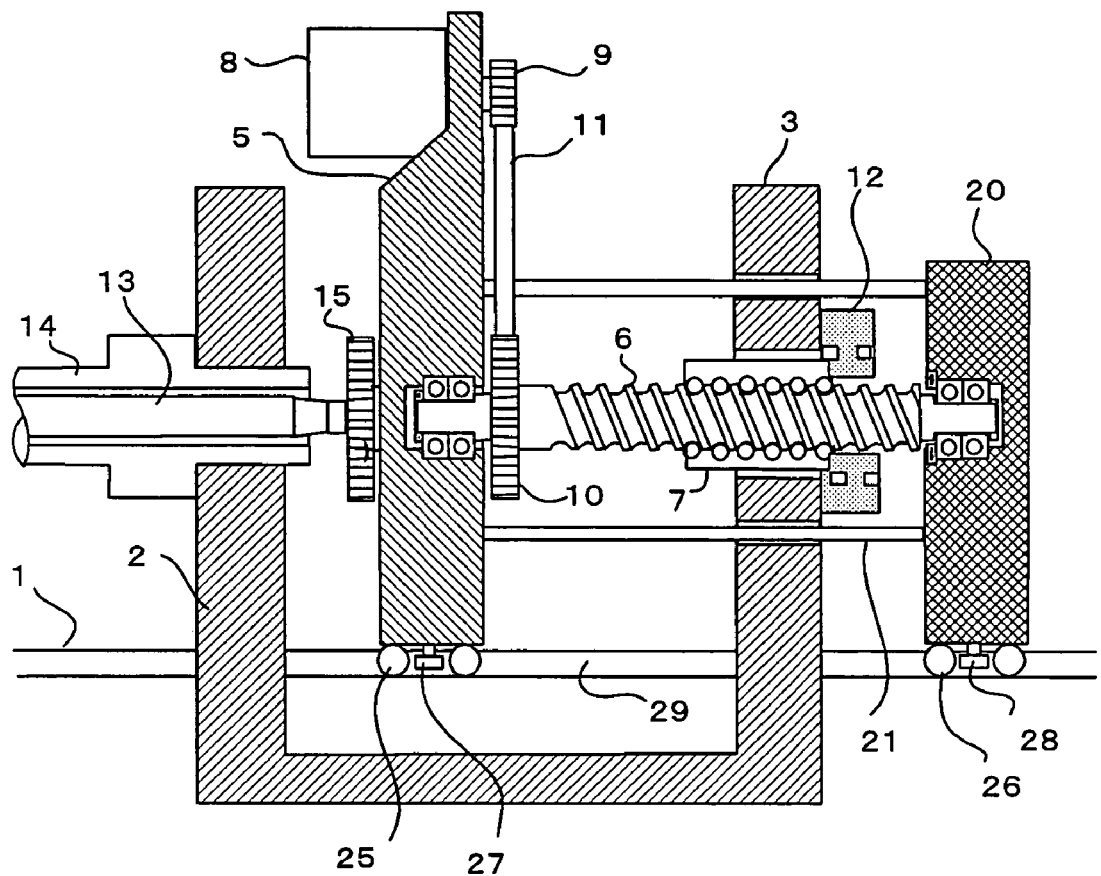
FIGS. 6a and 6b are explanatory views of a sixth embodiment of the present invention.
Figure 6B:
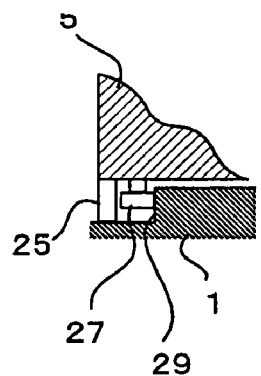

FIG. 6a is an explanatory view of a sixth embodiment of the present invention, and FIG. 6b is an explanatory view of a guide portion for the pusher plate 5 and the support plate 20.

The sixth embodiment is the one corresponding to the fifth embodiment except for the guide rods 4 being removed. Specifically, instead of the guide rods 4, guide rollers 27, 28 for guiding the motions of the pusher and support plates 5, 20 are provided between opposing faces of the pusher and support plates 5, 20 and the base 1.

In the sixth embodiment, the base 1 of the injection unit is formed with a pair of steps or grooves for guiding the pusher plate 5 and the support plate 20, the steps or grooves extending parallel to the direction of injection (the axial direction of the injection screw 13). More specifically, the pair of the grooves or steps are formed in those upper face portions of the base 1 which face opposite lateral ends of lower faces of the pusher and support plates 5 and 20, respectively, and are spaced apart from each other at substantially the same distance as the width of the pusher and support plates 5, 20. Reference numeral 29 denotes a wall of each of the grooves or steps. The wall 29 extends parallel to the direction of injection. As shown in FIGS. 6a and 6b, the pusher and support plates 5, 20 are respectively mounted at their lower faces with guide rollers 27, 28 that are in contact with the wall 29 of the groove or step and rotatable around a perpendicular axis. As a result, the pusher and support plates 5, 20 are moved back and forth while being guided by the guide rollers 27, 28 and the walls 29 of the pair of the grooves or steps extending parallel to the direction of injection. The pusher and support plates 5, 20 are supported for forward and backward movement by the supporting rollers 25, 26 as in the case of the fifth embodiment. Other construction and function are the same as those of the fifth embodiment, and explanations thereof are omitted.

Figure 7:
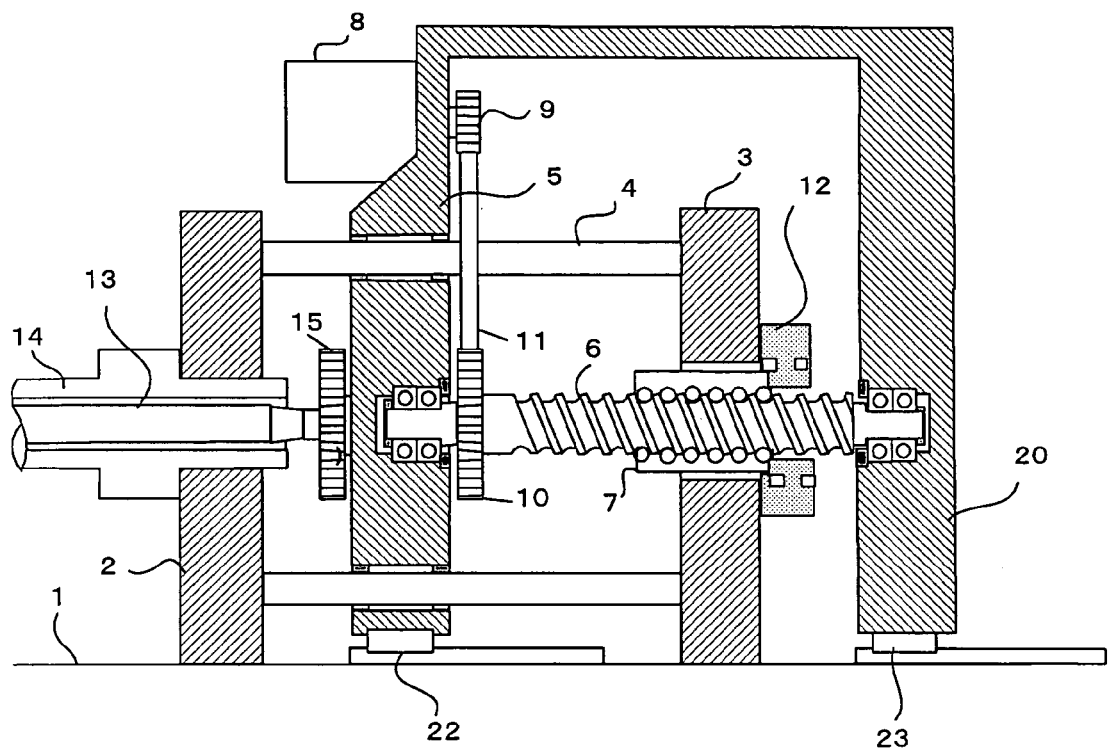
FIG. 7 is an explanatory view of a seventh embodiment of the present invention.

FIG. 7 is an explanatory view of a seventh embodiment of the present invention. As compared with the first embodiment shown in FIGS. 1a and 1b, the seventh embodiment is different in the way of coupling between the pusher and support plates 5, 20. In the first embodiment, the pusher and support plates 5, 20 are coupled and fixed to each other by the coupling rods 21. In the fifth embodiment, on the other hand, the pusher and support plates 5, 20 are formed into one piece bypassing the rear plate 20, without the rear plate 20 being formed with holes that permit the connecting rods 21 for coupling the pusher and support plates 5, 20 or other member to extend therethrough. In this embodiment, the pusher and support plate 5, 20 are coupled together by a plate member that straddles an upper part of the rear plate 3 as shown in FIG. 7. Other constructions are the same as the first embodiment, and the operation of the injection unit is the same as the first embodiment. Thus, explanations thereof are omitted.

Figure 8A:
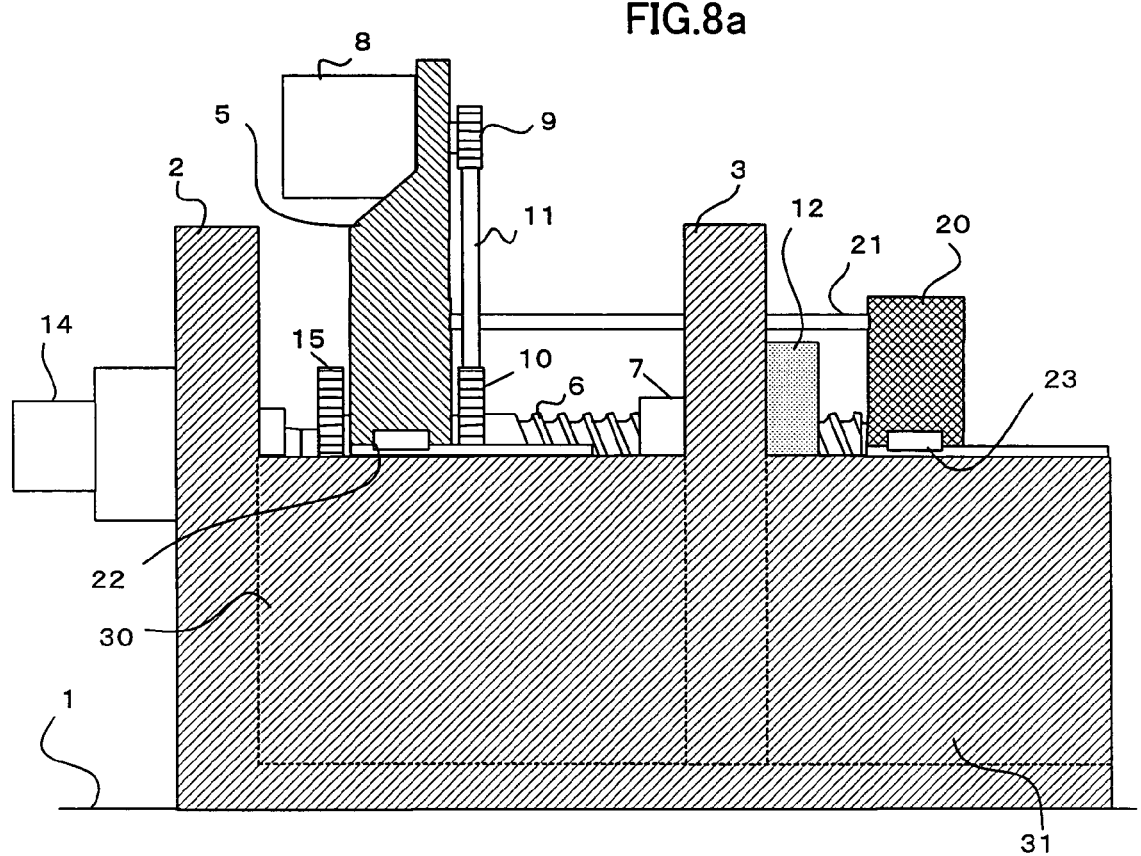
FIGS. 8a and 8b are explanatory views of an eighth embodiment of the present invention.
Figure 8B:
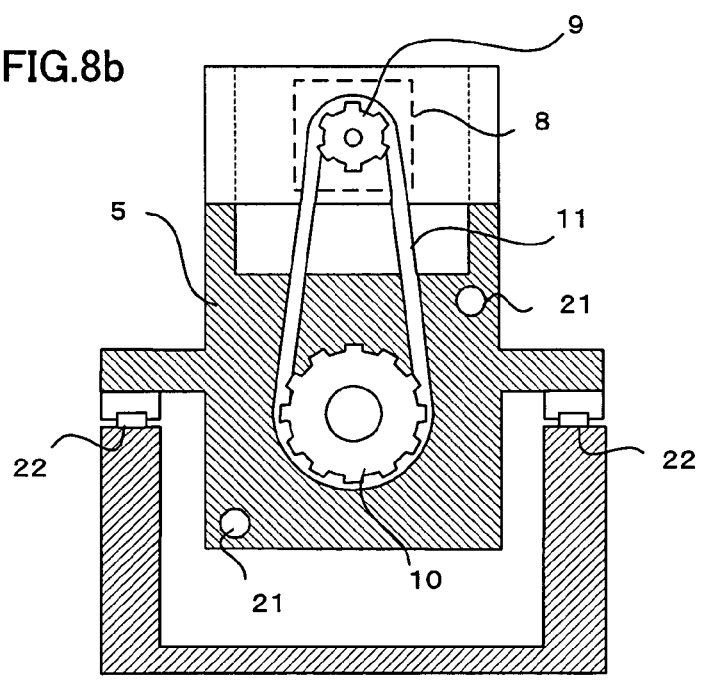

FIGS. 8a and 8b are explanatory views of an eighth embodiment of the present invention.

In the eighth embodiment, no guide rods 4 are provided, and the front and rear plates are formed into one piece and mounted on the base 1 of the injection unit, as in the case of the second embodiment shown in FIG. 2. A wall member 30, on which a pair of supporting members are placed so as to be spaced apart from each other in the direction perpendicular to the direction of injection, is extended between the front and rear plates 2, 3, and a wall member 31 on which a pair of supporting members are placed is extended behind the rear plate 3. The pusher and support plates 5, 20 have their extensions extending outward in the direction perpendicular to the direction of injection. Linear motion guides 22, 23 serving as the supporting members for supporting and guiding the pusher and support plates 5, 20 are provided between lower faces of the extensions and upper faces of the wall members 30 and 31, respectively. FIG. 8b shows the linear motion guides 22 serving as the supporting members for supporting and guiding the pusher plate 5. The other constructions are the same as those of the second embodiment shown in FIG. 2.

The operation of the eighth embodiment is the same as the second embodiment. In addition, since the wall members 30, 31 are provided between the front and rear plates 2, 3 and behind the rear plate 3, respectively, the prevention of tilting of the rear plate can be more ensured, which is caused when a reaction force of the injection pressure produced at the time of injection is applied to the injection screw 13, the pusher plate 5, the ball screw 6, the nut 7, and the rear plate.

What is claimed is:

1. An injection unit of an injection molding machine for moving an injection screw axially, comprising:
    a rear plate;
    a ball nut attached to said rear plate to be unrotatable and axially immovable;
    a pusher plate supported movably in an axial direction of said injection screw for pushing one end of the injection screw;
    a support plate supported movably in the axial direction of said injection screw and connected with said pusher plate to be moved therewith; and
    a ball screw threadedly engaged with said ball nut and having one end rotatably supported by said pusher plate to be immovable with respect to said pusher plate and another end rotatably supported by said support plate, thereby said pusher plate is moved with said support plate by rotation of said ball screw to move the injection screw axially.

2. An injection unit of an injection molding machine according to claim 1, wherein said pusher plate and said support plate are supported by support members provided on a base.

3. An injection unit of an injection molding machine according to claim 1, wherein a motor for rotating said ball screw is mounted on said pusher plate and rotation of said motor is transmitted to said ball screw through a timing belt connecting a driving pulley fixed to said motor and a driven pulley fixed to said ball screw.

4. An injection unit of an injection molding machine according to claim 1, wherein a motor for rotating said ball screw is mounted on said support plate and the other end of said ball screw is connected to the motor through a coupling behind said support plate.

5. An injection unit of an injection molding machine according to claim 1, wherein a motor for rotating said ball screw is mounted on said support plate, and rotation of said motor is transmitted to said ball screw through a timing belt connecting a driving pulley fixed to said motor and a driven pulley fixed to said ball screw.

6. An injection unit of an injection molding machine according to claim 1, wherein said rear plate is integrally formed with a front plate supporting a heating cylinder into which the injection screw is inserted.

7. An injection unit of an injection molding machine according to claim 1, wherein said pusher plate is integrally formed with said support plate.

8. An injection unit of an injection molding machine according to claim 1, wherein a member for placing the supporting members is provided on the base.

* * * * *